(12) United States Patent
Chou et al.

(10) Patent No.: US 8,752,215 B2
(45) Date of Patent: Jun. 17, 2014

(54) ELASTOMERIC FLEXIBLE ARTICLE WITH ABSORBANT POLYMER AND MANUFACTURING METHOD

(71) Applicant: Shen Wei (USA), Inc., Union City, CA (US)

(72) Inventors: Belle L. Chou, Union City, CA (US); Ping Zhang, Yangzhong (CN)

(73) Assignee: Shen Wei (USA) Inc., Union City, CA (US)

( * ) Notice: Subject to any disclaimer, the term of this patent is extended or adjusted under 35 U.S.C. 154(b) by 0 days.

(21) Appl. No.: 13/931,186

(22) Filed: Jun. 28, 2013

(65) Prior Publication Data
US 2013/0283499 A1 Oct. 31, 2013

Related U.S. Application Data

(62) Division of application No. 11/460,964, filed on Jul. 28, 2006, now Pat. No. 8,499,363.

(51) Int. Cl.
*A41D 19/02* (2006.01)

(52) U.S. Cl.
USPC ............................................................ 2/169

(58) Field of Classification Search
None
See application file for complete search history.

(56) References Cited

U.S. PATENT DOCUMENTS

| | | | |
|---|---|---|---|
| 4,548,844 A | 10/1985 | Podell et al. | |
| 4,842,593 A | 6/1989 | Jordan et al. | |
| 4,950,692 A | 8/1990 | Lewis et al. | |
| 5,534,350 A | 7/1996 | Liou | |
| 5,545,451 A | 8/1996 | Haung et al. | |
| 5,636,382 A | 6/1997 | Chopko et al. | |
| 6,203,835 B1 | 3/2001 | Westermarck et al. | |
| 6,345,394 B1 | 2/2002 | Nakamura et al. | |
| 6,399,853 B1 | 6/2002 | Roe et al. | |
| 6,423,328 B2 | 7/2002 | Chou | |
| 6,630,152 B2 | 10/2003 | Chou | |
| 6,658,670 B1 | 12/2003 | Grilliot et al. | |
| 6,718,556 B2 | 4/2004 | Zuckerwar et al. | |
| 6,732,735 B1 | 5/2004 | Snell | |
| 6,772,444 B2 | 8/2004 | Tremblay-Lutter | |
| 6,855,410 B2 | 2/2005 | Buckley | |
| 6,870,019 B2 | 3/2005 | Kajiwara et al. | |
| 6,871,359 B2 | 3/2005 | Hanada et al. | |
| 6,874,336 B2 | 4/2005 | Yarborough et al. | |
| 6,953,483 B2 | 10/2005 | Lietke et al. | |
| 7,037,579 B2 | 5/2006 | Hassan et al. | |
| 7,041,367 B2 | 5/2006 | Janssen et al. | |
| 7,048,884 B2 | 5/2006 | Woodford et al. | |
| 7,178,171 B2 | 2/2007 | Griesbach | |
| 7,217,754 B2 | 5/2007 | Koloski et al. | |
| 8,499,363 B2 * | 8/2013 | Chou et al. ........................ 2/159 |
| 2003/0017193 A1 | 1/2003 | Chou | |
| 2003/0205847 A1 | 11/2003 | Warneke et al. | |
| 2004/0031087 A1 | 2/2004 | Griesbach | |
| 2005/0183186 A1 | 8/2005 | Hanada et al. | |
| 2005/0222543 A1 | 10/2005 | Shao | |
| 2006/0026737 A1 | 2/2006 | Chen | |
| 2006/0045899 A1 | 3/2006 | Sarangapani | |
| 2006/0090243 A1 | 5/2006 | Becerra et al. | |
| 2006/0140994 A1 | 6/2006 | Bagwell et al. | |
| 2006/0141165 A1 | 6/2006 | Hassan et al. | |
| 2006/0179541 A1 | 8/2006 | Woodford et al. | |
| 2007/0098768 A1 | 5/2007 | Close et al. | |
| 2007/0118967 A1 | 5/2007 | Flather et al. | |
| 2007/0192929 A1 | 8/2007 | Flather et al. | |

FOREIGN PATENT DOCUMENTS

| | | |
|---|---|---|
| CA | 1283753 | 5/1991 |
| EP | 0425 270 A2 | 5/1991 |
| FR | 2813777 | 9/2000 |
| JP | 62-177202 A | 8/1987 |
| JP | 08-294930 A | 11/1996 |
| JP | 2003-064514 A | 3/2003 |
| JP | 2006-512492 T | 4/2006 |
| JP | 2007-515565 T | 6/2007 |
| WO | WO 2005/060856 | 7/2005 |
| WO | WO 2005/110749 | 11/2005 |
| WO | WO 2007/070131 A1 | 6/2007 |

OTHER PUBLICATIONS

Roberts, A.D. and Brackley, C.A.; Comfort and Frictional Properties of Dental Gloves; Journal of Dentistry; 1996; vol. 24, No. 5; pp. 339-346 Elsevier Science Ltd.; UK.
"Aquadri™ Ansell Moisture Management Technology" 2 page Product leaflet, date unknown.
Formosa Plastics Corporation: Products Information, website: http://www.fpc.com.tw (date unknown).
Magid Glove and Safety Manufacturing Company, website: http://www.magidglove.com, 2008-2009.
GO™, Gloves-Online™ Your Source for Gloves, website: http www.gloves-online.com, 2008.
WIPO, International Preliminary Report on Patentability for International Application No. PCT/US2007/074526.
European Patent Search Report, mailing date Mar. 17, 2011, for corresponding European Patent Application No. 07 813 440.0-1256.
Extended European Patent Search Report and European search opinion, mailing date Mar. 17, 2011, for corresponding European Patent Application No. 07 813 440.0-1256.
Communication under Rule 71(3), mailing date of Apr. 16, 2012, for corresponding European Application No. 07813440.0-1256.
Japanese Office Action, mailing date of Apr. 2, 2012, for corresponding Japanese Application No. 2009-522010.
Certificate and Publication of Specification, dated Sep. 9, 2012, for corresponding European application No. 07813440.0, now Patent No. EP2068666B1.
Japan Office Action with English translation, mailing date Jan. 7, 2013, for corresponding Japan Application No. 2009-522010.

\* cited by examiner

*Primary Examiner* — Suzanne Ziska
(74) *Attorney, Agent, or Firm* — Intellectual Property Law Group LLP

(57) ABSTRACT

An elastomeric flexible article and method for manufacture has moisture absorbing characteristics. An example of such an article is a disposable protective glove that includes a first layer; and a second layer with an effective amount of super absorbent polymer dispersed therein, the second layer to be closer to a hand than the first layer, when the glove is worn on the hand. The second layer is configured to absorb excess moisture, when the glove is worn for a period of time, to facilitate wet donning and provide for breathability of the skin, and thereby to provide for a comfortable environment for the skin.

10 Claims, 1 Drawing Sheet

ELASTOMERIC FLEXIBLE ARTICLE WITH ABSORBANT POLYMER AND MANUFACTURING METHOD

CROSS-REFERENCE TO RELATED APPLICATIONS

This is a divisional of commonly owned U.S. application Ser. No. 11/460,964, filed on Jul. 28, 2006, which is hereby incorporated herein in its entirety by reference.

FIELD OF INVENTION

The present invention relates to elastomeric flexible articles with absorbent polymer, for example, gloves or the like. In particular, the present invention relates to elastomeric flexible articles with absorbent polymer.

BACKGROUND

Disposable gloves, for example, have played a significant role in the fields of chemistry, biology, and medicine by being widely used as a protective measure to insulate hands from objects handled by a glove wearer. Disposable gloves have been widely used within the food industry, in which gloves are commonly used to protect against food contamination during food preparation, and within the medical community, in which gloves have been worn by health care professionals such as surgeons, nurses, dentists and other personnel for protection from infectious agents. The medical community has long been concerned about microbial cross-contamination between patients and health care professionals. Health care professionals frequently wear gloves as a physical barrier form of protection to reduce the risk of being exposed or contaminated through hands by infectious agents such as viruses or bacteria.

To allow ease in handling objects, conventional disposable gloves typically are made of thin and elastic materials to minimize the space between the skin and the glove. One disadvantage with this type of glove is that it has been suggested that channels can exist in, for example, latex gloves, which can allow viruses to pass through to the user's hand. Although it is customary for health care professionals to wash their hands frequently with an antimicrobial agent in a skin cleanser before donning gloves, the effect of the antimicrobial agent may be short-lived and the infectious agents such as viruses or bacteria may regrow beneath the gloves in the moist warm environment. A further disadvantage is that prolonged wearing of disposable gloves can cause a moist environment on the surface of the hand that allows viruses, bacteria, yeast, fungus and other infectious agents to grow and multiply. Itchiness and irritation can be a frequent result of wearing disposable examination gloves for extended periods, making such gloves uncomfortable for wearing. The occlusive and tight nature of disposable gloves prevent the skin from breathing especially during prolonged periods of use. In addition, many in the medical or dental professions have the need to don gloves when hands are still wet right after washing. Such disposable gloves become very difficult to don when the skin is wet making it very inconvenient for wet hand donning.

To alleviate perspiration, powders are commonly used on the inner surface of disposable gloves, in addition to making donning, wearing, and removal of gloves easier. However, there are several disadvantages that can be associated with powders. Continuous perspiration can easily overwhelm the thin layer of powder that is commonly on the surface of the glove. This is especially the case when continuous and frequent wearing of gloves is required. For example, dentists may continuously wear gloves during a dental surgical procedure for up to 40 minutes or more. In addition, hand washing is necessary after the use of powdered gloves. Frequent hand washing to remove powders is inconvenient and may also cause excessive dryness of the skin.

Still further, conventional skin preparations for gloves may be incapable of prolonged effectiveness within gloves, in the presence of accumulating perspiration and other substances that can overwhelm the preparations. Still further, conventional skin preparations for gloves may contain substances that are undesirable to some users for some applications, for example, substances that are unfamiliar to users (for example, antibacterial agents that do not occur naturally) or substances that are suspected of being harmful (for example, conventional antiperspirants).

SUMMARY OF THE INVENTION

The present invention is directed toward improved elastomeric flexible articles, for example, disposable examination gloves or the like.

According to an embodiment of the present invention, there is a disposable protective glove comprising a first layer; and a second layer, to be closer to the hand than the first layer, the second layer having an effective amount of an absorbent polymer substance dispersed therein or thereon to be in contact with a hand, when the glove is worn on the hand. The second layer is configured to absorb, when the glove is worn, excess perspiration or moisture of the skin, thereby maintaining a less moist environment than normally occurring with normal disposable gloves.

According to another embodiment of the present invention, there is a disposable protective article comprising an outer layer; and an inner layer to be closer to the skin than the outer layer, the inner layer having less proteins than natural rubber latex and comprising an interior surface with a super absorbent polymer substance dispersed therein the inner layer material as well as a skin conditioning or soothing substance dispersed thereon; wherein the absorbent polymer substance serves to absorb excess perspiration or moisture on the skin and some of the skin conditioning or soothing substance will interact physically with the remaining perspiration from the skin and thereto increase in ability to condition or soothe the skin.

According to another embodiment of the present invention, there is a method for making a disposable protective article for protecting skin, the disposable protective article to comprise multiple layers or coatings. The method comprises forming a first layer, the first layer comprising an elastomeric flexible material; and forming a second layer, the second layer comprising an elastomeric flexible material and to be closer to the skin than the first layer when the disposable protective article is in use, wherein the second layer includes an absorbent polymer substance dispersed therein or thereon to help absorb excess perspiration or moisture on the skin when the disposable protective article is used on skin. A skin soothing, skin conditioning, or skin moisturizing and/or antibacterial coating may also be applied to the inner second layer for contact with the skin when in use.

According to other embodiments of the present invention, there is a method for making any glove according to any embodiment of the present invention.

According to other embodiments of the present invention, there is a glove made by a method according to any embodiment of the present invention.

BRIEF DESCRIPTION OF THE DRAWINGS

Features, aspects, and advantages of some embodiments of the present invention will become better understood with reference to the accompanying drawings, which are not to be considered limitative in the scope of the invention, but are merely illustrative.

DETAILED DESCRIPTION OF SPECIFIC EMBODIMENTS

The drawings and the description in the present document, including the abstract, describe one or more currently preferred embodiments of the present invention and also describe some optional features and alternative embodiments. The description and drawings are for the purpose of illustration and not limitation. The title, section titles, and the like of the present document are terse and are for convenience and not limitation.

According to an embodiment of the present invention, there is a super absorbent polymer elastomeric flexible article. According to another embodiment of the present invention, there is a method of manufacturing.

The following references are hereby incorporated by reference in their entireties for all purposes:

U.S. patent application Ser. No. 10/719,573, filed Nov. 22, 2003, entitled "An Antimicrobial Elastomeric Flexible Article and Manufacturing Method";

U.S. patent application Ser. No. 10/138,370, filed May 2, 2002, entitled "An Elastomeric Flexible Article and Manufacturing Method";

U.S. Pat. No. 6,953,582, entitled "Skin-enhancing glove and method of manufacture";

U.S. Pat. No. 6,423,328, entitled "Aloe Vera Glove and Manufacturing Method"; and U.S. Pat. No. 6,630,152, also entitled "Aloe Vera Glove and Manufacturing Method".

First and Second Layers

Figure 1:
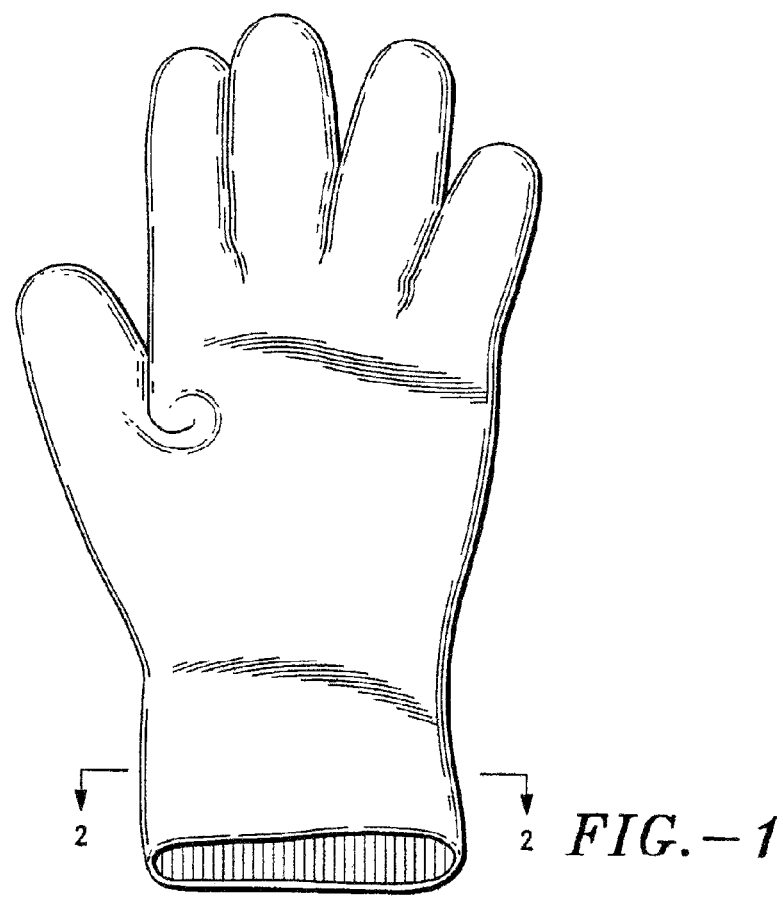
FIG. 1 shows a front perspective view of one embodiment of the present invention, in which the elastomeric flexible article with absorbent polymer is a glove.
Figure 2:
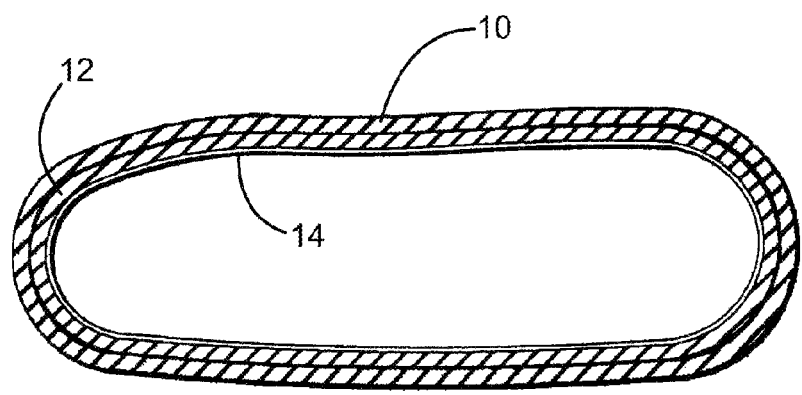
FIG. 2 is a sectional view of the elastomeric flexible article with absorbent polymer shown in FIG. 1.

As illustrated in FIGS. 1 and 2, an absorbent polymer elastomeric flexible article according to some embodiments of the present invention is a disposable protective glove. The disposable protective glove includes a first layer 10 and a second layer 12. The flexible article is shown as a glove in FIGS. 1 and 2, but other forms of articles may also be used, for example, condoms, or other protective articles or the like to be worn on, or to cover, a portion of the body, or the like. For example, the protective glove may be embodied as a glove without any layer of porous material overlying the hand, e.g., without any layer of porous material.

During use, the first layer 10 includes an elastomeric flexible material such as that commonly used for disposable gloves. The second layer 12 is closer to a user's hand than the first layer. When the glove is worn on the user's hand, the second layer 12 can be sufficiently configured to absorb excess perspiration or moisture from the skin and allow for a feeling of breathability on the skin. The second layer 12 can provide an additional barrier to protect the user from infectious agents.

In some embodiments of the present invention, the elastomeric flexible article is a protective glove that is simple and convenient to use and allows the user to wear the glove and to perform fine tasks with precision. For example, the glove may be embodied as a disposable examination glove made of at least two layers, a first layer 10 and a second layer 12. The first layer 10 can be made of a single layer that can be made of various materials known to those of ordinary skill in the art. Resinous materials such as vinyl or the like or polymer materials such as acrylonitrile or the like are common choices. Three commonly used materials for making disposable gloves are natural rubber latex, acrylonitrile, and polyvinyl chloride, although any other elastomeric material may also be used. Still other materials, for example, polyurethane, chloroprene, neoprene, butadiene, or the like, or any elastomeric material known to those with ordinary skill in the art may also be used.

The second layer 12, which is closer to the user's hand, can be made of a single layer of fluid-impermeable material that can provide an additional barrier to help protect the user from substances associated with the first layer 10 (e.g., allergenic proteins or antimicrobial agents) and from infectious agents. For example, second layer 12 may be embodied to include a non-porous material overlying the hand, e.g., without any layer of porous material. The second layer 12 can include, for example, any of the above materials used for the first layer 10 that are fluid impermeable. Preferably, the second layer 12 is not made of latex since latex can have allergenic proteins that are difficult or expensive to satisfactorily remove or deal with. Thus, preferably, the second layer 12 includes less proteins than natural latex. In addition to the specific materials discussed, any combination of suitable materials may be used, e.g., nitrile-nitrile, or any other combination. Furthermore, preferably according to an embodiment, the second layer 12 forms a substantially smooth inner surface for contact with the skin.

In some embodiments of the present invention, the elastomeric flexible article is a protective glove that has an overall thickness at the fingers of no more than about 0.3 mm, or no more than about 0.2 mm. The glove may have a minimum thickness at the fingers of at least about 0.08 mm. The glove may include two layers as discussed in the present document, with the inner layer having, at the fingers, at least about 5 percent, or at least about 10 percent of the thickness of the glove. Still, other thicknesses can be chosen, depending on the intended application.

Further Discussion of Second Layer

To disperse the absorbent polymer within second layer 12, an absorbent polymer resin is dispersed into an elastomeric compound. For example, the absorbent polymer or more preferably a super absorbent polymer known as SAP may be incorporated into a composition (e.g., a liquid or slurry) that will coagulate to form the second layer 12. The super absorbent polymer can be dispersed substantially homogeneously throughout the second layer of the glove, e.g., by mixing the composition to which the absorbent polymer has been added.

The dispersement of the super absorbent polymer into the second layer 12 can result in the substantially uniformability for absorption of excess perspiration or moisture from the skin, resulting in a glove that is effective in keeping the hand dryer, cooler and comfortable. The glove is effective especially for warm temperature wear in summertime conditions or other warm environments where the hands may sweat more than usual. The dispersement of the super absorbent polymer also lends to better breathability of the skin during wearing of the glove.

To dispose the absorbent polymer layer 12 onto or adjacent to a surface of first layer 10, any competent method can be used. For example, the absorbent polymer layer 12 can be disposed on the surface of the first layer, e.g., by being spray-coated or immersion-coated onto the formed or forming first layer of the glove.

Embodiments of the present invention can use any competent absorbent polymer or super absorbent polymer, also known as SAP. SAP is highly water absorbent and non-toxic, having the ability to hold absorbed water even under pressure. Some examples of such polymers include synthesized polymers such as polyacrylamide, polyacrylate, polyacrylic acid, polyacrylate sodium (or ammonium), polymethacrylate, polyvinyl acetate, maleic anhydride, polystyrene, and their copolymers (or terpolymers) or the like. Other agents can also be used. Such agents include a starch (or cellulose) graft acrylonitrile (or epoxy chloropropane, acrylic acid, acrylate, methyleacrylate, acrylamide, styrene, vinylacetate) copolymer or terpolymer.

A currently preferred embodiment of the present invention is a glove wherein the effective super absorbent polymer is polyacrylamide. The chemistry of polyacrylamide is a potassium salt of cross-linked polyacrylicacid/polyacrylamide copolymer. Polyacrylamide is a super absorbent polymer that is commercially available, for example, under the name LiquiBlock 40F. The SAP in the present invention is processed to form a SAP resin dispersion which is dispersed into the elastomeric glove compound. This dispersion comprising SAP resin is the resulting SAP layer 12. The effectiveness of the SAP resin dispersion in the layer 12 of the present invention provides about 200 to about 300 times the moisture absorption ability than a common elastomeric glove without such a layer. See Table 1 below for an example of the effectiveness of the SAP resin dispersion in the layer 12 in providing moisture absorption ability compared to common latex and nitrile gloves. Three specimens for each glove were weighed in a dry state and then weighed after contacting water for 5 minutes.

and absorbing perspiration. According to some embodiments of the present invention, the second layer 12 of the disposable protective glove includes an interior surface and a preparation 14 disposed on the interior surface. The second layer 12 is configured to such that the preparation 14 can adhere to the interior surface of second layer 12. In accordance with another embodiment of the present invention, the second layer 12, can provide beneficial results to the user's hands. The interior surface of the second layer 12, is closer to a user's hand than the first layer. In accordance with some embodiments of the present invention, the second layer 12 and first layer 10 are laminated together, e.g., the surfaces are in direct contact with one another.

Discussion of Preparation on Second Layer

In accordance with some embodiments of the present invention, a preparation 14 can include an anti-microbial substance additionally applied to the second layer. In one embodiment, the preparation 14 uses an anti-microbial substance that is a naturally-occurring substance. For example, the anti-microbial substance in the preparation 14 may be a plant-derived, or edible-plant-derived, acid, and the preparation 14 may include a buffer that helps resist change in pH during wearing of the disposable protective glove. The interior surface of the second layer 12 coated with preparation 14, preferably is in contact with the user's skin, which can intermingle with any perspiration from the skin, and due to the presence of the preparation 14, has a property of being anti-bacterial, antiviral, or a combination thereof. Additional anti-microbial substances can overcome microbial growth that can form when a user's hand perspires inside a glove. For example, an embodiment of the preparation 14 may be any embodiment described in the incorporated-by-reference U.S. patent application Ser. No. 10/138,370. In yet another embodiment of the present invention, the preparation 14 can

TABLE 1

| | Common latex glove | | | SAP dispersion latex glove example | | | Common nitrile glove | | | SAP dispersion nitrile glove example | | |
|---|---|---|---|---|---|---|---|---|---|---|---|---|
| Item | 1 | 2 | 3 | 1 | 2 | 3 | 1 | 2 | 3 | 1 | 2 | 3 |
| Dry state | 0.3504 | 0.3430 | 0.3420 | 0.3618 | 0.3487 | 0.3657 | 0.3066 | 0.3124 | 0.3137 | 0.2985 | 0.2993 | 0.2973 |
| Wet state | 0.3557 | 0.3505 | 0.3475 | 0.3847 | 0.3734 | 0.3892 | 0.3151 | 0.3233 | 0.3259 | 0.3229 | 0.3234 | 0.3248 |
| Result | 1.5% | 2.2% | 1.6% | 6.3% | 7.1% | 6.4% | 2.8% | 2.8% | 3.9% | 8.2% | 8.1% | 9.2% |

According to some embodiments of the present invention, the super absorbent polymer may be present from about 50.0% by weight to about 90% by weight of the total dry weight of the second layer of the glove. Preferably, the SAP is present from about from 80.0% by weight to 90.0% by weight of the total dry weight of the second layer of the glove. Still other amounts of SAPs may be used. Further, the amounts chosen to be used can depend on the type of SAP used.

According to a currently preferred embodiment, the SAP is polyacrylamide, and the SAP can be dispersed throughout the second layer, the amount of the SAP dispersion may be present less than about 90.0% by weight of the second layer. The concentration of the SAP dispersion, according to an embodiment of the invention, may be present at about 1% to about 5%. Preferably, the SAP dispersion concentration is about 2.5% to about 3.5%. Still other concentrations are possible.

Embodiments of the present invention include a second layer 12 that can provide an additional barrier to protect the user from infectious agents while facilitating wet donning include moisturizers and/or soothing agents such as aloe vera which can provide beneficial results to the user's hand. For example, the preparation 14 may include ingredients from any coating described in the incorporated-by-reference U.S. Pat. No. 6,953,582, 6,423,328 or 6,630,152, for example, aloe vera or other skin-beneficial substances. Generally, the preparation 14 may embody any coating described in the incorporated-by-reference U.S. Pat. Nos. 6,953,582, 6,423,328, 6,630,152 or U.S. patent application Ser. No. 10/138,370, or any coating that is a combination of any of the ingredients for coatings described therein. For example, the preparation may include both an antimicrobial agent (e.g., a naturally occurring type of acid, e.g., with an additional buffer) and also a skin-benefiting substance (e.g., aloe vera).

Methods of making various embodiments of preparation 14 are as set forth in the incorporated-by-reference U.S. patent application Ser. No. 10/138,370, U.S. Pat. Nos. 6,953, 582, 6,423,328, 6,630,152, or any combination thereof.

According to one embodiment of the present invention, during use of the glove, the environment encountered by the hand within the glove is acidic, due to presence of the preparation 14. The acidic environment not only can provide an extra layer of microbial protection for the user, but can also provide beneficial results by exfoliating and smoothing a user's hands. For example, the preparation may be an acidic preparation that has been dried onto the inner surface of the glove, and perspiration from the hand moistens the dried acidic preparation. For example, no other moisture is introduced into the worn glove, other than by perspiration. The acidic preparation may be a mixture that includes an acidic solution, and the mixture may, but need not, itself be a solution. Preferably, the preparation 14 contains a buffer, to help maintain the pH and stabilize pH drift. Whether or not the preparation was dried onto the inner surface of the glove, the preparation during use is acidic in the embodiment. Preferably, the pH of the preparation 14 during use is lower than about 6, for example, between about 3.8 to about 6, or, more preferably, between about 4.5 to about 6, or between about 5 to about 5.8. Preferably, the preparation 14 is formulated to maintain pH within the desired range even after some prolonged use, e.g., even after some prolonged perspiration. Low pH may be used to provide skin exfoliation.

The preparation 14 may be disposed onto the interior surface of the second layer 12 by any manner whatsoever. For example, the preparation may be disposed onto the elastomeric flexible article in dry (e.g., powder) or moist (e.g., wet mixture) form. In one embodiment of the present invention, the preparation is preferably disposed onto the elastomeric flexible article, e.g., glove, in non-powder form. Preferably, the preparation is disposed onto the elastomeric flexible article in non-dry form and then is preferably fully or at least substantially dehydrated. Preferably, the dehydration is conducted such that the preparation is dehydrated onto the elastomeric flexible article, and such that there is a force provided by the dehydration that attaches the preparation to a surface of the elastomeric flexible article. Preferably, the preparation is disposed onto the elastomeric flexible article during factory production, and not by an end buyer or end owner or end wearer of the article.

In an embodiment of the present invention, the preparation 14 contains, as mentioned above, a buffer to help maintain the pH and stabilize pH drift. Any competent buffer can be used. Buffers are well known to those of ordinary skill in the art.

Still further, optionally, thickeners can be used in the preparation 14 to promote more even coating. Typical thickeners used preferably are non-greasy and non-oily compounds. Exemplary polymers and thickeners are listed in the CTFA Cosmetic Ingredient Handbook, 1st Ed., J. M. Nikitakis ed., The Cosmetic, Toiletry and Fragrance Association, Washington, D.C. (1988) (hereafter CTFA Handbook), at pages 30, 47, 48, 67 and 97-100, incorporated herein by reference. Any thickeners that are well known to those skilled in the art can be used.

In some embodiments of the invention, the preparation 14 can include other optional ingredients, for example, antiperspirants and/or skin soothing substances, or the like. Skin soothing substances include, for example, skin moisturizing substances, skin nourishing or skin anti-irritant substances. In addition, the preparation can also include other optional ingredients, for example, glycerin, which is a water-soluble emollient and emulsion aid, preservatives, fragrances, or dyes, or the like.

Examples of skin soothing substances include, for example, a skin moisturizing agent, especially for embodiments of the invention that are not dried onto the glove. Examples also include aloe vera, lotions, creams, and the like.

The acidic solution within the preparation typically includes an organic acid, such as a hydroxycarboxylic acid, herein termed a "hydroxy acid". The acidic solution within the mixture typically includes an alpha-hydroxycarboxylic acid, herein termed an "alpha-hydroxy acid". In accordance with an embodiment of the present invention, the acid solution present typically is a hydroxycarboxylic acid, generally an alpha-hydroxycarboxylic acid, for example, malic acid.

Exemplary hydroxy acids are disclosed in the incorporated-by-reference U.S. patent application Ser. No. 10/138,370. The particular amount of acid included in the preparation is dependent upon the type of acid, the production method and equipment, and the intended end use for the preparation-coated glove, for example, frequent or long-duration wearing, infrequent or short-duration wearing, use primarily to deter infection, or use to deter infection and also to exfoliate skin.

In one embodiment of the present invention, the preparation 14 contains about 0.1% to about 20% by weight of an acid, before being dry. Toward the higher end of this range, skin exfoliation abilities tends to be greater. In another embodiment of the present invention, the preparation contains about 0.1% to about 10% by weight of an acid, before being dry. In another embodiment of the present invention, the preparation contains about 0.2% to about 2% by weight of an acid, before being dry. The acid may be a hydroxy acid, or another type. Whatever the actual concentration or type of acid used, whether explicitly listed herein or not, the invention is preferably embodied so as also to achieve the earlier-discussed desired pH values.

Generally, cosmetologists and dermatologists use high concentrations of hydroxy acids (for example, 50 to 70 percent by weight) as superficial peels, to smooth rough skin, and to remove fine lines, acne scars, age spots, irregular pigmentation, and precancerous scaly patches. Moderate concentrations of hydroxy acids have typically been seen (for example, 10 to 50 percent by weight) to help control acne by unplugging pores, and to enhance the effectiveness of Retin-A and skin bleaches. However, at these concentrations, the hydroxy acid-containing products often provide dramatic results, but the potential to irritate or burn the skin is high. At hydroxy acid concentrations of, for example, 30% by weight or more, the compositions are capable of chemically burning the skin.

Accordingly, it is helpful to balance the acidic nature of an acidic solution with the skin-irritation potential of the solution. Many acid-containing compositions, including hydroxy acid-containing compositions, often warn the user that a tingling or burning sensation may be felt after the first several applications of the composition to the skin. In accordance with some embodiments of the present invention, it is preferable to provide an elastomeric flexible article, such as a disposable glove, that minimizes or avoids the tingling or burning sensation or irritation that can be associated with chemical burns due to acids, yet provide the beneficial antibacterial, anti-fungal, antiviral effects of these acids.

In accordance with an embodiment of the present invention, the hydroxy acid in the acidic solution may be any acid. For example, the hydroxy acid can be an aliphatic acid, e.g., glycolic acid; an aromatic acid, e.g., salicylic acid; or have aromatic and aliphatic components, e.g., mandelic acid. Exemplary hydroxy acids include the alpha-hydroxy acids, such as, but not limited to, glycolic acid, citric acid, lactic acid, tartaric acid, and malic acid. These alpha-hydroxy acids are naturally-occurring acids found in fruit, and have been used in skin care and skin treatment compositions for several years. It has been theorized that glycolic acid and lactic acid are the most effective alpha-hydroxy acids, if exfoliation is desired, because these acid molecules are small and more able to penetrate skin. Hydroxycaprylic acid is a synthetic alpha-hydroxy acid that has been used in skin care compositions. Other useful alpha-hydroxy acids are, for example, mandelic acid, leucic acid, azelaic, acid and ethylglycolic acid.

Beta-hydroxy acids, like salicylic acid, beta-hydroxypropionic acid and beta-hydroxybutyric acid, also are useful in the acidic solution of an embodiment of the present invention. In general, any aliphatic alpha- or beta-hydroxy acid having an aliphatic carbon chain containing two through ten carbon atoms can be used in the acidic solution. The hydroxy acid can be a monocarboxylic acid, a dicarboxylic acid, or a polycarboxylic acid.

The acid in the acidic solution is not limited to hydroxy acids. Essentially any acid that is used, or can be used, in cosmetic compositions for skin can be incorporated into the present solution. The acids traditionally are organic acids.

The acidic second layer of the disposable glove according to an embodiment of the present invention retains the characteristic of a disposable examination glove without any externally visible structural modification, and is easy and convenient to use. The affiliation between the acidic mixture (for example, a buffered malic acid solution) and the interior surface may be through a force provided by dehydration. Such affiliation is loosened when perspiration dissolves the dehydrated acidic pH solution. The longer a glove is worn, the more likely the hand will perspire, and consequently more acidic solution will be dissolved and disassociated from the glove surface, and be applied to the hand. The acidity of the solution can then condition hand skin and prevent microorganisms from growing under the wet condition. Any excess moisture as mentioned can further be absorbed by the absorbent polymer in the second layer. Thus providing further comfort to the skin.

In one embodiment, a solution of malic acid with a pH of about 5.5 is used to coat the gloves. Malic acid solution is distributed on the inner surface of the glove at a thickness of about 0.01 millimeter. Preferably, the distribution of the malic acid is substantially even and uniform. Preferably, the association between malic acid and the surface is achieved at least in part due to a non-covalent force provided through dehydration.

Further Discussion of Methodologies

Some embodiments of the present invention are methods for producing elastomeric flexible articles with absorbent polymer, for example, disposable gloves.

According to some of the method embodiments of the present invention, there is a method for producing gloves (or other article) having moisture absorbing and wet-hand donning characteristics. According to one such method, a glove having at least two layers is to be formed, e.g., using a glove former, for example, a conventional glove former that is shaped somewhat like a hand. According to this method, a glove layer A (e.g., the inner "second" glove layer 12 discussed above) is formed or begins to be formed, e.g., on the glove former. Some time thereafter, another glove layer B (e.g., the outer "first" glove layer 10 discussed above) is formed over the glove layer A. For example, the layers A and B are laminated where the surfaces are in direct contact with each other. Thereafter, a coating A may be applied onto the available surface of the glove layer A (i.e., the surface that does not face the glove layer B. For example, the coating A may be applied onto the glove layer A after the glove is both stripped from the former and inverted such that the glove layer A faces outward. The glove layers A or B may be any combination of an outer and an inner layer, e.g., elastomeric layers, each as described anywhere in the present document or in the incorporated-by-reference documents. In addition to the specific materials discussed, any combination of suitable materials may be used, e.g., nitrile-nitrile, or any other combination. Similarly, the coating A can be any coating as described anywhere in the present document or in the incorporated-by-reference documents. In some specific example methods discussed in this document, the layer A is "outer", relative to the layer B when the glove is to be worn. However, alternative implementations can form the layer A and coating A as "inner", relative to the layer B when the glove is to be worn, for example, by including the re-ordering of some steps.

According to an embodiment of the invention, there is a method for producing gloves (or other articles) having moisture absorbing and wet donning characteristics. According to this method, gloves are to be formed on a formers, for example, conventional glove formers that are each shaped somewhat like a hand. According to this method, a glove is made as follows:

preferably, a former is cleaned using any competent method, e.g., any conventional method;

preferably, the former is dried or heated using any competent method, e.g., any conventional method;

a layer, which will be the outer layer when the glove is worn, is formed using any competent method;

thereafter, a layer, which will be the inner layer when the glove is worn, is formed adjacent, preferably immediately adjacent, the outer layer using any competent method, for example, any conventional method adapted to use a material composition that includes an amount of super absorbent polymer, preferably the amount by itself being an effective amount; wherein the inner layer provides moisture absorption for the wearer's hand, during a period of wearing of the glove;

preferably, thereafter, the gloves are stripped from the formers and turned outside-out;

preferably, thereafter, an optional inner coating is applied onto the inner layer, onto what will be the inner surface of the inner layer when the glove is worn, either by spraying or by immersion, wherein the inner layer includes either or preferably both of a skin-soothing substance and an antimicrobial substance, the antimicrobial substance for the optional inner coating preferably including an acid, preferably of a type that naturally-exists in a preferably edible plant and preferably including a buffer.

EXAMPLE METHODS

Some specific example implementations of methods according to some embodiments of the present invention are summarized below. Generally, the individual steps are self-explanatory, in view of previous description in this document and/or in the incorporated-by-reference documents U.S. Pat. Nos. 6,423,328, 6,630,152, 6,953,582 or U.S. patent application Ser. Nos. 10/138,370 and 10/719,573. A particular set of formulations that can be used in these example methods are summarized in some of Tables A-G.

Example Method 1

Gloves (or other articles) having two layers are formed in which the outer layer is largely of natural rubber, the inner layer is largely of nitrile, and the optional inner coating is applied. As will be seen, chlorination is used to prepare the nitrile's inner surface. In this example method 1, as in the other example methods, not all steps are mandatory steps.

The example method 1 includes: dipping the former in powder-free coagulant, drying, dipping in natural rubber latex (base latex), drying/curing, leaching, dipping in nitrile comprising super absorbent polymer resin, drying/curing, stripping the glove from the former, washing, reversing gloves, chlorinating, washing, drying/post-curing, reversing gloves, applying the inner coating, drying, cooling.

Generally, the particular parameters for the example methods may be varied according to the requirements and wishes of the manufacturer. For example, different standards of dryness or leached-ness or vulcanization or cleanliness or the like may be sought to be reached by the manufacturer depending on the particular required quality or grade of the glove product.

One particular set of parameters, for the example method 1, is recited in this paragraph below within parentheses, in a re-listing of the example 1 method's steps. Variations of the parameters, and, more generally, determining of the parameters, will be within the expertise of those of ordinary skill in the art.

The example 1 method, re-listed: dipping the former in powder-free coagulant (e.g., the coagulant at about 45 degrees Celsius), drying (e.g., for about 3 minutes at about 65° C.), dipping in natural rubber latex (e.g., the latex at no more than about 40° C.), drying/curing (e.g., for about 20 minutes at about 110° C.), leaching (e.g., for about 3 minutes in warm water at about 85° C.), drying (e.g., for about 5 minutes at about 80° C.), dipping in nitrile containing SAP resin dispersement (e.g., the nitrile at no more than about 40° C.), drying/curing (e.g., for about 20 minutes at about 20° C.), stripping the glove from the former, leaching (e.g., for about 3 minutes in water at about 85° C.), reversal of the glove, chlorinating (e.g., for about 2 minutes at about 350 parts per million at no more than about room temperature, e.g., followed by neutralization in, e.g., ammonia for, e.g., about 2 minutes), leaching (e.g., for about 5 minutes in cold water, e.g., at no more than about 40° C.), drying/curing (e.g., for about 15 minutes at about 85° C.), reversal of the glove, optionally surface treating (e.g., spray non-stick coating during the tumble drying using a conventional silicone-based coating), drying (e.g., by tumble drying for about 30 minutes at about 55° C. to 65° C.).

Example Method 2

Gloves (or other articles) having two layers re formed in which the outer layer is largely of natural rubber, the inner layer is largely of nitrile, and the optional inner coating is applied. As will be seen, chlorination is used to prepare the nitrile's inner surface, and the inner coating is applied after the gloves are stripped from the formers. The method includes: dipping the former in coagulant, drying, dipping in natural rubber latex, drying/curing, leaching, drying, dipping in nitrile containing SAP resin dispersion, drying/curing, stripping, rinsing, reversing glove, chlorination, rinsing (e.g., in warm water), rinsing again (e.g., in cold water), drying, dipping in inner coating solution, drying, reversing glove, surface treating, and drying.

Example Method 3

Gloves (or other articles) having two layers are formed in which the outer layer is largely of nitrile, the inner layer is largely of nitrile, and the optional inner coating is applied. As will be seen, chlorination is used to prepare the nitrile's inner surface. The example method includes: dipping the former in powder-free coagulant, drying, dipping in nitrile rubber, drying/curing, leaching, drying, dipping in nitrile containing SAP resin dispersion, drying/curing, leaching, chlorinating, leaching, drying/curing, dipping into inner coating solution, drying, stripping the glove from the former, drying/post-curing, optional surface treating (e.g., apply non-stick coating), drying.

Example Method 4

Gloves (or other articles) having two layers re formed in which the outer layer is largely of nitrile, the inner layer is largely of nitrile, and the optional inner coating is applied. As will be seen, chlorination is used to prepare the nitrile's inner surface, and the inner coating is applied after the gloves are stripped from the formers. The method includes: dipping the former in coagulant, drying, dipping in nitrile rubber, drying/curing, leaching, drying, dipping in nitrile containing SAP resin dispersion, drying/curing, stripping, rinsing, reversing glove, chlorination, rinsing, drying, reversing glove, applying inner coating solution, drying, surface treating, and drying.

Example Method 5

Gloves (or other articles) having two layers re formed in which the outer layer is largely of nitrile, the inner layer is largely of polyurethane, and the optional inner coating is applied. The method includes: dipping the former in powder-free coagulant, drying, dipping in nitrile, drying/curing, leaching, drying, dipping in polyurethane comprising SAP resin dispersion, drying, dipping in inner coating mix, drying, stripping, drying, optional surface treating (spraying non-stick coating), drying.

Example Method 6

Gloves (or other articles) having two layers re formed in which the outer layer is largely of nitrile, the inner layer is largely of polyurethane, and the optional inner coating is applied. As will be seen, the inner coating is applied after the gloves are stripped from the formers. The method includes: dipping the former in coagulant, drying, dipping in nitrile, drying/curing, leaching, drying, polyurethane with a SAP resin dispersion coating, leaching, drying, stripping, rinsing, rinsing again, applying inner coating solution, drying, optional surface treating (spraying non-stick coating), and drying.

Example Method 7

Gloves (or other articles) having two layers re formed in which the outer layer is largely of polyvinyl chloride (PVC), the inner layer is largely of polyurethane, and the optional inner coating is applied. The method includes: dipping in PVC, drying, polyurethane with SAP resin dispersion coating, drying, dipping in inner coating solution, drying, stripping, drying.

Example Method 8

Gloves (or other articles) having two layers re formed in which the outer layer is largely of PVC, the inner layer is largely of polyurethane, and the optional inner coating is applied. As will be seen, the inner coating is applied after the gloves are stripped from the formers. The method includes: dipping in PVC, drying, polyurethane with SAP resin dispersion coating, drying, stripping, applying inner coating solution, drying.

Example Method 9

Gloves (or other articles) having two layers are formed in which the outer layer is largely of natural rubber, the inner layer is largely of nitrile, and the optional inner coating is applied. As will be seen, the initial preparation of a SAP resin is described. In this example method 9, as in the other example methods, not all steps are mandatory steps.

The example method 9 includes: preparing an SAP resin dispersion in nitrile (surface latex), dipping the former in powder-free coagulant; drying, dipping in natural rubber latex (base latex), drying/curing, leaching, drying, dipping in SAP resin dispersion in nitrile (surface latex), drying/curing, stripping the glove from the former, washing, reversing gloves, chlorinating, washing, drying/post-curing, reversing gloves, drying, and cooling; wherein the preparation of the surface latex comprises the steps of milling SAP resin, preparing pre-vulcanized nitrile latex, adding nitrile latex to the SAP resin dispersion, continuously agitating/stirring for a period of time.

Generally, the particular parameters for the example methods may be varied according to the requirements and wishes of the manufacturer. For example, different standards of moisture absorption or wet donning characteristics based on the SAP dispersion or the like may be sought to be reached by the manufacturer depending on the particular required quality or grade of the glove product.

One particular set of parameters, for the example method 9, is recited in Tables A-C where Table A describes the process of preparing the SAP resin; Table B describes the process or preparing the surface latex, i.e., the SAP resin dispersion; and Table C describes preparing the latex layer.

Example methods and articles according to some embodiments of the present invention have already been described. A particular set of example formulations that might be used with the example methods 1-9 are shown in Tables A-G. The example formulations are merely examples, and it would be apparent to those of ordinary skill in the art that the example formulations can be changed, even dramatically in some cases, and still embody various embodiments of the present invention. For example, many ingredients in the tables are merely optional ingredients or particular embodiments or examples of classes of ingredients. Merely for example, vulcanization accelerator, or antioxidant, or colorant, or the like are optional ingredients. For another example, the example quantities or quantity ranges are merely examples according to particular embodiment(s) of the invention; in other embodiments, the quantities or quantity ranges can vary. In the various tables, the symbol "~" is used to mean "about"; thus, "~5" would mean "about 5", for example.

TABLE A

Example SAP resin dispersion for adding into inner glove-layer material (e.g., latex or nitrile compounding materials)

| Example dispersion ingredient | Example actual or active parts by weight |
|---|---|
| Polyacrylamide resin | ~3 to ~5 |
| NF dispersant | ~0.5 to ~1 |
| (Soft) Water | ~90 to ~96 |

Example preparation details
Milling the polyacrylamide resin (SAP) in a ball-mill to assure desired granularity and sufficient dispersion. (e.g., use a ball mill of at least 1000 L volume.) Combine 3 parts resin, 1 part NF dispersant and 96 parts soft water begin milling; add about 1 part resin after milling for 24 hours; add another about 0.5-1 part resin after milling for 48 hours; mill for another 48 hours.

TABLE B

Example Nitrile latex with SAP resin dispersion for inner layer (e.g., for example processes 1-4, 9)

| Example dispersion ingredient | Example concentration | Example parts by weight |
|---|---|---|
| SAP resin dispersion | ~2.5% | ~80 to ~90 |
| Nitrile latex | ~36% | ~10 to ~15 |
| Surfactant (e.g., 320 solution) | ~10% | ~0.5 to ~2 |

Example preparation/usage details
Prepare compounded nitrile latex (about 36% concentration) and add to the SAP resin dispersion (about 3% concentration) with continuous agitation. Agitate/stir for about 3 to 4 hours. Ratio of nitrile latex to SAP resin is ~0.07:~1. For example, add 70 grams of 36% nitrile latex to 1000 grams of 3% SAP resin dispersion, thus the dry weight of SAP in the compound is 54.3%.

TABLE C

Example Inner Layer Nitrile Composition used with Outer Layer Latex (e.g., for example processes 1, 2, 9)

| Example dispersion ingredient | Example actual dry or active parts by weight | Example concentration | Example actual parts by weight |
|---|---|---|---|
| Nitrile | ~41 ± 1 | ~36% | ~98 |
| Potassium Hydroxide | ~0.2 to ~2 | ~20% | ~1 to ~10 |
| Sulphur | ~0.2 to ~2 | ~50% | ~0.4 to ~4 |
| Zinc Oxide Vulcanization Accelerator | ~0.2 to ~2 | ~50% | ~0.4 to ~4 |
| Zinc Diethyl Dithiocarbamate | ~0.2 to ~2 | ~50% | ~0.4 to ~4 |
| Titanium dioxide | ~0.2 to ~2 | ~50% | ~0.4 to ~4 |
| BZ (zinc dibutyldithiocarbamate) | ~0.1 to ~0.5 | | |

TABLE D

Example Inner Layer Nitrile Composition used with Outer Layer Nitrile (e.g., for example processes 3, 4)

| Example dispersion ingredient | Example actual dry or active parts by weight | Example concentration | Example actual parts by weight |
|---|---|---|---|
| Nitrile | ~41 ± 1 | ~36% | ~98 |
| Sulphur | ~0.2 to ~2 | ~50% | ~0.4 to ~4 |
| Zinc Oxide Vulcanization Accelerator | ~0.2 to ~2 | ~50% | ~0.4 to ~4 |
| Zinc Diethyl Dithiocarbamate | ~0.2 to ~2 | ~50% | ~0.4 to ~4 |
| Titanium dioxide | ~0.2 to ~2 | ~50% | ~0.4 to ~4 |
| BZ (zinc dibutyldithiocarbamate) | ~0.1 to ~5 | | |

TABLE E

Example Outer Layer Latex Composition (e.g., for example processes 1, 2, 9)

| Example dispersion ingredient | Example actual dry or active parts by weight | Example concentration | Example actual parts by weight |
|---|---|---|---|
| Natural Rubber Latex | ~100 | ~20% | ~167 |
| Potassium Hydroxide | ~0.2 to ~2 | ~20% | ~1 to ~10 |
| Casein | ~0.2 to ~2 | ~10% | ~2 to ~20 |
| Zinc Oxide | ~0.2 to ~2 | ~50% | ~0.4 to ~4 |

TABLE E-continued

Example Outer Layer Latex Composition
(e.g., for example processes 1, 2, 9)

| Example dispersion ingredient | Example actual dry or active parts by weight | Example concentration | Example actual parts by weight |
|---|---|---|---|
| Vulcanization Accelerator | | | |
| Zinc Diethyl Dithiocarbamate Antioxidant | ~0.2 to ~2 | ~50% | ~0.4 to ~4 |
| Wingstay ® L | ~0.2 to ~2 | ~50% | ~0.4 to ~4 |
| 2,6-Di-tert-butyl-4-methyl phenol | ~0.2 to ~2 | ~50% | ~0.4 to ~4 |
| Sulphur | ~0.2 to ~2 | ~50% | ~0.4 to ~4 |
| Colorant (Titanium dioxide) | ~0.2 to ~2 | ~50% | ~0.4 to ~4 |

TABLE F

Example Outer Layer Nitrile Composition
(e.g., for example processes 3, 4, 5, 6)

| Example dispersion ingredient | Example actual dry or active parts by weight | Example concentration | Example actual parts by weight |
|---|---|---|---|
| Nitrile | ~100 | ~20% | ~233 |
| Potassium Hydroxide | ~0.2 to ~2 | ~20% | ~1 to ~10 |
| Sulphur | ~0.2 to ~2 | ~50% | ~0.4 to ~4 |
| Zinc Oxide Vulcanization Accelerator | ~0.2 to ~2 | ~50% | ~0.4 to ~4 |
| Zinc Diethyl Dithiocarbamate | ~0.2 to ~2 | ~50% | ~0.4 to ~4 |
| Titanium dioxide | ~0.2 to ~2 | ~50% | ~0.4 to ~4 |
| BZ (zinc dibutyldithiocarbamate) | ~0.2 to ~2 | | |

TABLE G

Example Outer layer Vinyl Composition

| Example dispersion ingredient | Example actual dry or active parts by weight |
|---|---|
| PVC | ~100 |
| dioctyl phthalate (DOP) | ~70–~85 |
| 2,2,4-Trimethyl-1,3-pentanediol diisobutyrate (TXIB) | ~5 to ~20 |
| Stabilizers | ~1 to ~5 |
| Viscosity Reducing Agent | ~5 to ~30 |

| Example dispersion ingredient | Example concentration | Example actual parts by weight |
|---|---|---|
| Polyurethane | ~30% | ~1 |
| (Soft) Water | | ~9 to ~15 |

The example methods 1-9 have been discussed. Of course, other specific implementations of methods are possible. In the above example methods, the inner layer contains an SAP resin dispersion which facilitates moisture absorption, wet hand donning and further provides for a comfortable humidity for the skin. As mentioned, the optional inner coating may be applied. For example, the inner coating may be an acidic coating that is buffered at or near the skin's natural pH to inhibit bacterial growth. The inner layer also serves as a second barrier for protecting the wearer's skin.

Further, in addition to the specific preparations discussed in the present document, or an Aloe Vera solution as discussed in the two references incorporated above (U.S. Pat. No. 6,274,154 or U.S. patent Ser. No. 09/938,715)

Again, any embodiment of the present invention may be embodied to alternatively or additionally use any other substance (e.g., any preparation) that can be dried or otherwise applied onto the inside of a glove and that, in the inside of the glove during wearing, is beneficial to the hand. Further the any other substance preferably does not require moisture to be artificially introduced into the glove after donning; instead, the only moisture to be introduced into the inner surface of the glove after donning is from perspiration from a hand during wearing of the glove.

Throughout the description and drawings, example embodiments, for example, products and methods, are given with reference to specific embodiments and configurations. However, the present invention is not limited to those specific embodiments or configurations. It will be appreciated by those of ordinary skill in the art that the present invention can be embodied in other specific forms without departing from the spirit and scope of the present invention.

For example, although glove embodiments are illustrated in FIGS. 1 and 2, any other article or form that contacts skin may also embody the present invention. For example, the present invention may be embodied as elastomeric flexible peels, articles, wraps, and (other) medical devices. Similarly, the composition and application of the preparation may be varied without departing from the spirit and scope of the present invention. For example, various different preparations may be utilized to obtain an ultimate final absorbent polymer elastomeric flexible article, for example, a glove, that has characteristics as described within the present document. For example, the formulations of the preparation may be varied in order to have a thicker or thinner coating or layers, as desired to control comfort in use, dexterity, sense of feel, or protection. Still other changes would be apparent.

The scope of the invention is not limited merely to the specific example embodiments or configurations of the foregoing description, but rather is indicated by the appended claims. All changes that come within the meaning and range of equivalents within the claims are intended to be understood as being embraced within the scope of the claims.

What is claimed is:

1. A method for making a disposable protective article for protecting skin, the disposable protective article to comprise multiple layers, the method comprising:
   forming a first layer;
   forming a second layer of non-porous fluid impermeable material, the second layer to be closer to the skin than the first layer and being a closest layer to the skin than any layer of fluid impermeable material of the article when the disposable protective article is in use, wherein the second layer comprises a super absorbent polymer resin dispersion therein or thereon to help absorb excess moisture on the skin when the disposable protective article is used, and wherein the second layer is the only layer of the article that comprises the super absorbent polymer resin dispersion.

2. The method according to claim 1, wherein the step of forming the first layer precedes the step of forming the second layer.

3. The method according to claim 1, wherein the second layer is formed having a smooth inner surface for contacting the skin.

4. The method according to claim 1, the method further comprising: applying a preparation to a surface of the second layer, the preparation including a skin conditioning substance that is activated by perspiration from the skin.

5. The method according to claim 4, wherein the first layer and the second layer of the article are formed on a former and the preparation is applied after the article is stripped from the former.

6. The method according to claim 1, the method further comprising:
applying a preparation to a surface of the second layer, the preparation including an antimicrobial agent.

7. The method according to claim 1, wherein the step of forming a first layer comprises coating a former with a composition that includes latex, nitrite, or PVC.

8. The method according to claim 1, wherein prior to the step of forming a second layer, the super absorbent polymer resin dispersion is prepared according to a method comprising:
grinding a super absorbent polymer resin; combining the ground super absorbent polymer resin with a dispersant and water; agitating the resulting dispersion for a period of time.

9. The method according to claim 8, wherein the step of forming a second layer comprises mixing the super absorbent polymer resin dispersion with an elastomeric composition and coating the first layer with the resulting dispersion mixed elastomeric composition.

10. The method according to claim 1, the method further comprising: applying a preparation to a surface of the second layer, the preparation including a skin conditioning substance; and dehydrating the preparation onto the surface of the second layer.

* * * * *